Oct. 14, 1952     A. E. JORGENSEN     2,613,546
DRIVE CHAINS AND CHAIN DRIVES ADAPTED TO USE SAID CHAINS
Filed April 4, 1950     4 Sheets-Sheet 1
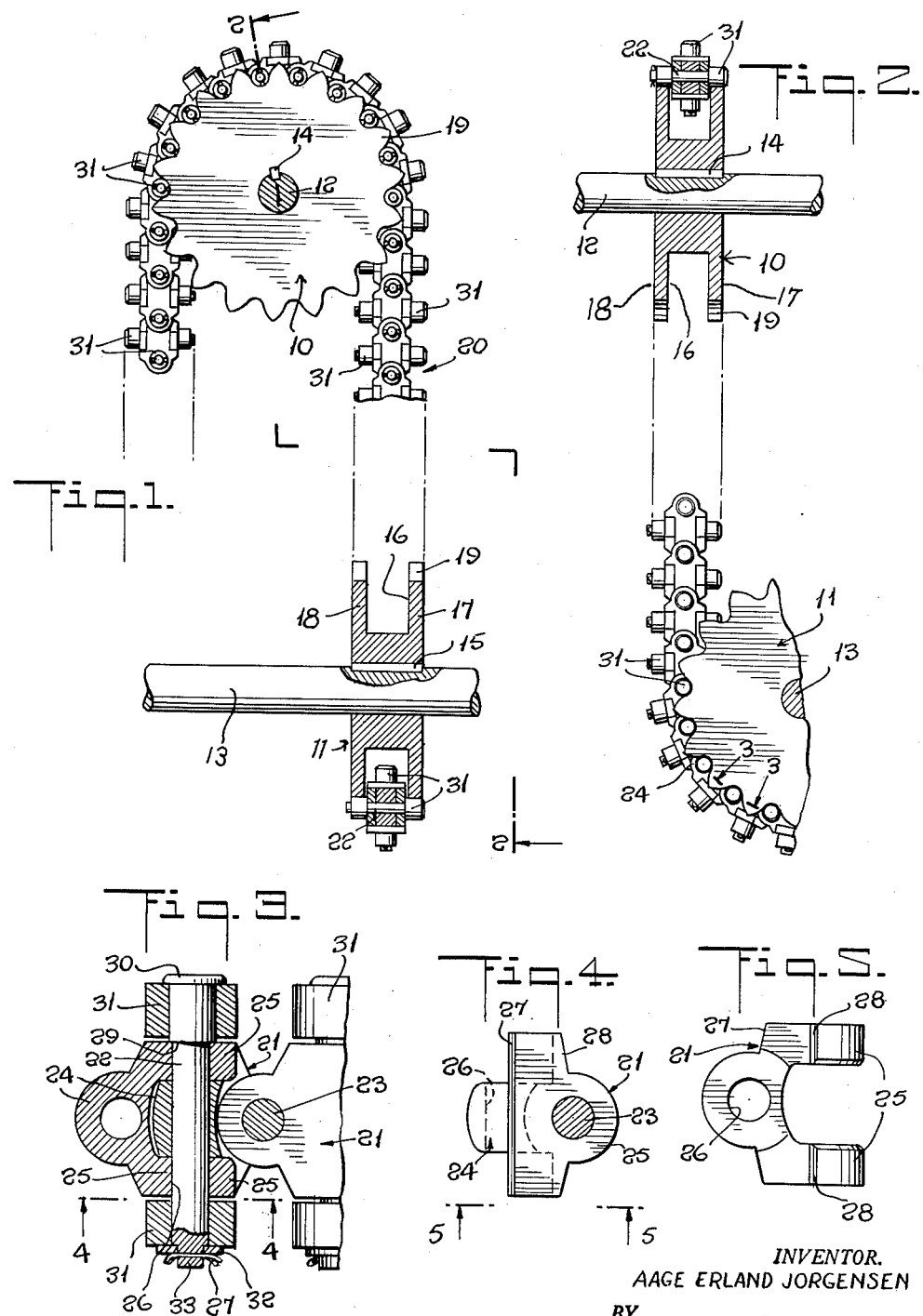
INVENTOR.
AAGE ERLAND JORGENSEN
BY
his ATTORNEY Oct. 14, 1952     A. E. JORGENSEN     2,613,546
DRIVE CHAINS AND CHAIN DRIVES ADAPTED TO USE SAID CHAINS
Filed April 4, 1950     4 Sheets-Sheet 2
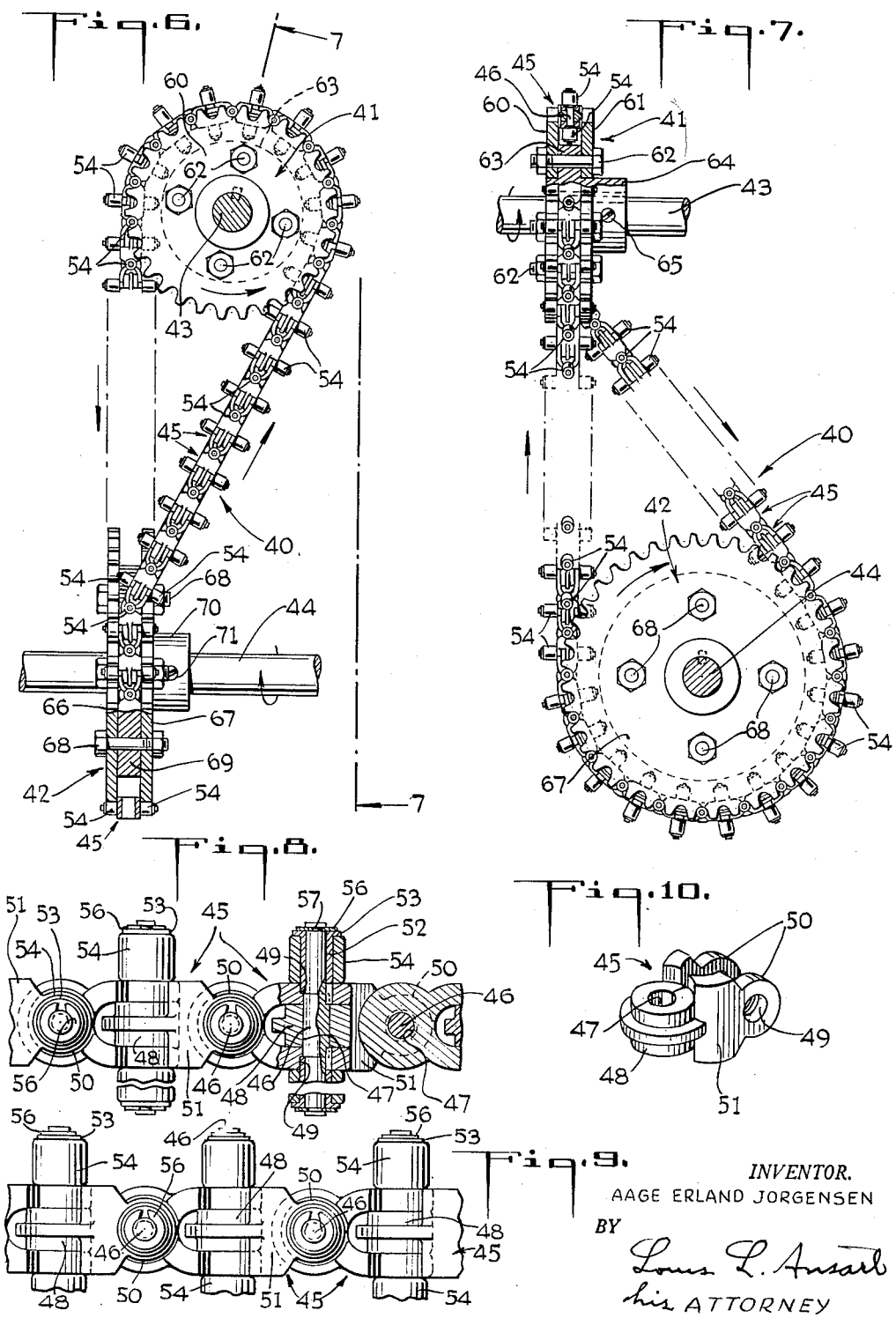
INVENTOR.
AAGE ERLAND JORGENSEN
BY
Louis L. Ansell
his ATTORNEY

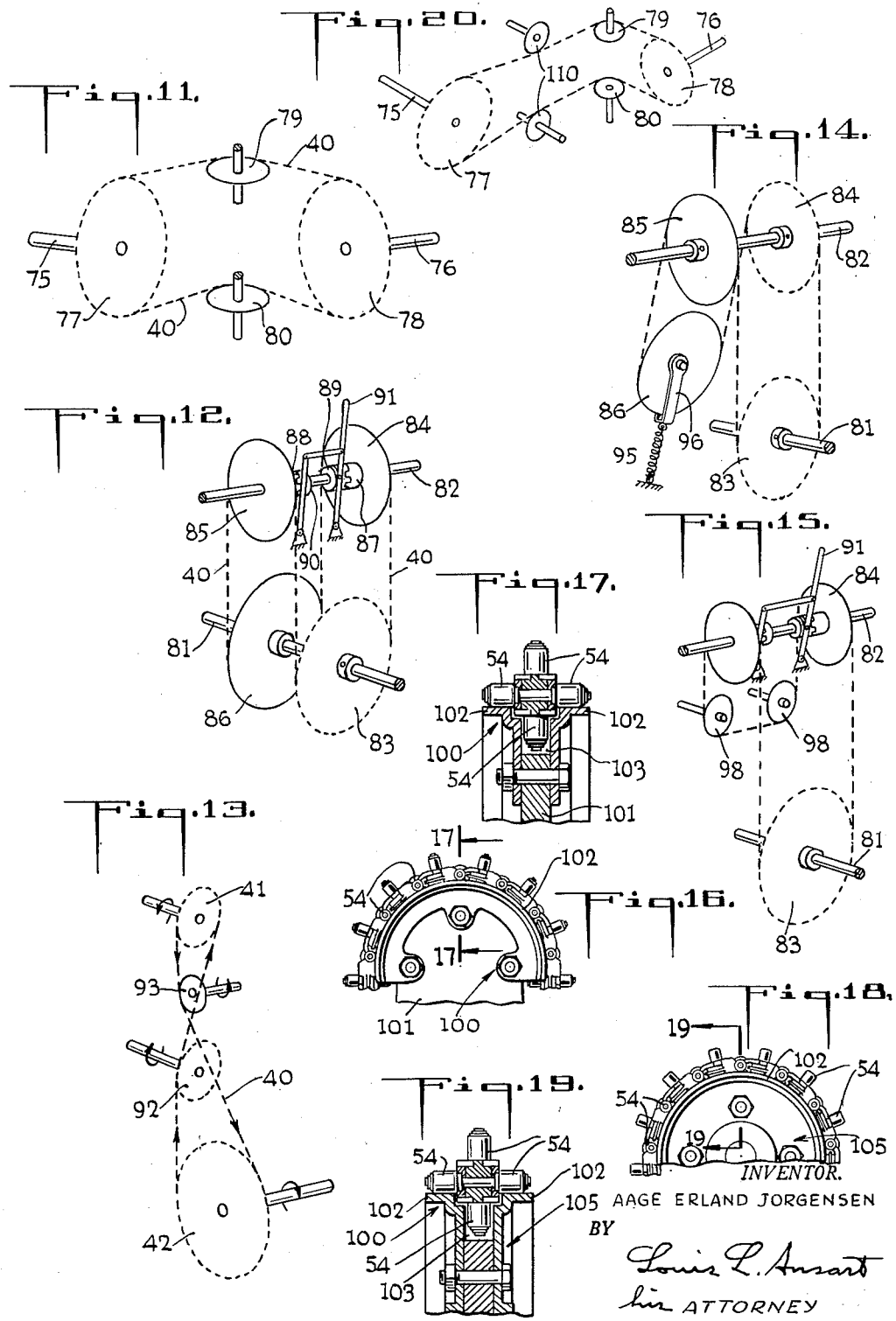

Oct. 14, 1952 A. E. JORGENSEN 2,613,546
DRIVE CHAINS AND CHAIN DRIVES ADAPTED TO USE SAID CHAINS
Filed April 4, 1950 4 Sheets-Sheet 4
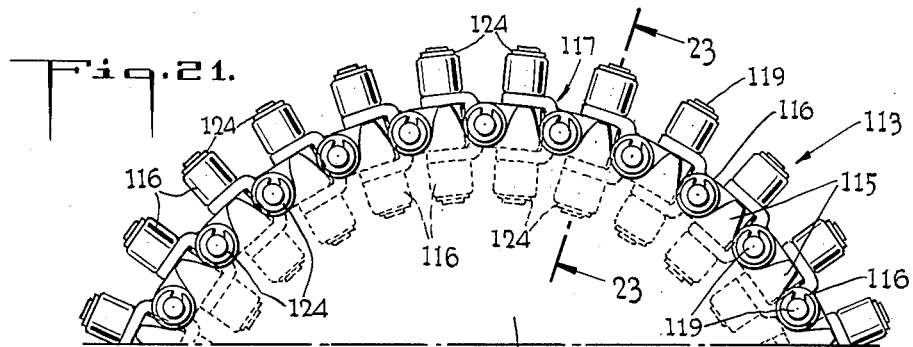
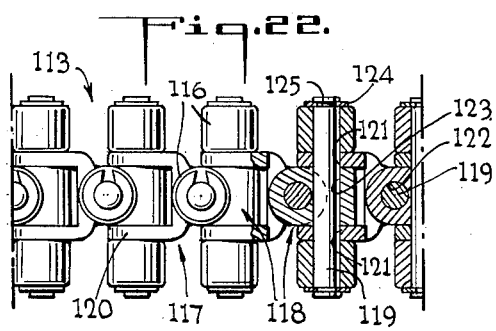
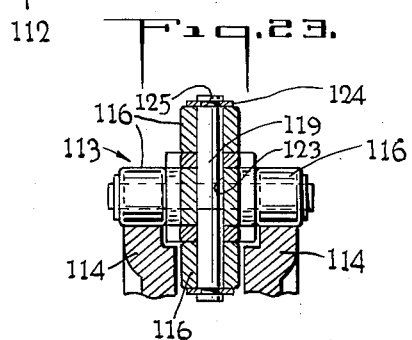
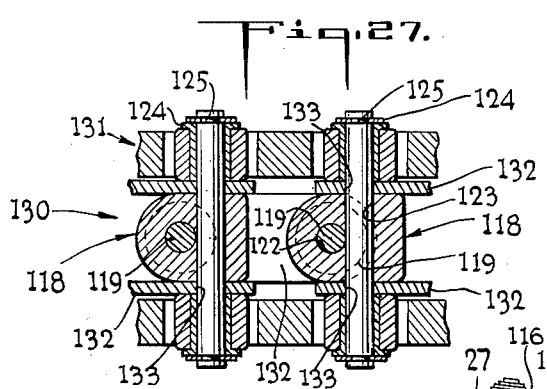
INVENTOR.
AAGE ERLAND JORGENSEN
BY
*his* ATTORNEY Patented Oct. 14, 1952

2,613,546

UNITED STATES PATENT OFFICE 2,613,546

DRIVE CHAINS AND CHAIN DRIVES ADAPTED TO USE SAID CHAINS

Aage Erland Jorgensen, Jersey City, N. J.

Application April 4, 1950, Serial No. 153,880

19 Claims. (Cl. 74—246)

1

This invention relates to novel and advantageous roller chains and chain drives using said roller chains and adapted for use in transmitting power from one rotatable shaft to another. This application is a continuation in part of my prior application, Ser. No. 100,621, filed June 22, 1949, now abandoned.

Chains now generally in use for this purpose require two sprocket wheels connected thereby to be in the same plane. This means that the shafts on which these sprocket wheels are mounted must be parallel. In cases where it is desired to transmit power between shafts that are not parallel, use is made of gears of the conventional type with their teeth engaging directly. Except in special cases it is necessary not only to install gears on the shafts between which power is to be transmitted, but also to install one or more intermediate shafts with gears. Such intermediate shafts require bearings for their support and the bearings require rigid supports, all of which add to the cost of the drive and to the weight of the machine.

Important objects of this invention are to provide novel and advantageous drive chains which are non-twistable and to provide novel and advantageous chain drives adapted to use the chains of the present invention and to transmit power between sprocket wheels that are not in the same plane and the corresponding shafts without the use of intermediate sprocket wheels and corresponding shafts.

Another object of the invention is to provide a novel and advantageous drive chain which will provide greater flexibility in designing power transmission means between shafts in different arrangements presenting difficult problems for solution in order to use chain drives or gear drives of forms heretofore in use.

Yet another object of the invention is to provide a slip-free mechanical transmission between two shafts through corresponding rotary members mounted on said shaft but not in the same plane, in a more economical way than heretofore.

Heretofore it has been suggested to use a twistable chain for transmitting power between shafts that are not parallel. However, such a twistable chain is complicated in structure and its use is limited by the amount of twist that can safely be given to a certain length of chain. The links come to a sprocket wheel while turned a certain amount out of the sprocket wheel plane and must be forced into this plane by the sprocket teeth, thus producing noise and wear.

A chain of the present invention does not twist and the arrangement is such as to cause the chain

2 to enter a sprocket wheel in exactly the right direction.

Other objects, features and advantages will appear upon consideration of the following detailed description and of the drawings, in which:

Fig. 1 is a more or less diagrammatic view, illustrative of the present invention, wherein there are two sprocket wheels in different planes which are inclined with respect to each other, and a nontwist chain adapted to cooperate therewith;

Fig. 2 is a section taken on line 2—2 of Fig. 1;

Fig. 3 is an enlarged sectional view taken on line 3—3 of Fig. 2;

Fig. 4 is a sectional view taken on line 4—4 of Fig. 3;

Fig. 5 is an elevational view taken generally on line 5—5 of Fig. 4;

Fig. 6 is a view similar to Fig. 1 but with certain changes;

Fig. 7 is an elevation as seen from the right of Fig. 6, parts being broken away along the line 7—7;

Fig. 8 is a view of the chain of Fig. 6, parts being broken away to show the interior structure;

Fig. 9 is a view of the chain of Fig. 6 as seen from above in Fig. 8;

Fig. 10 is a perspective view of one of the links;

Fig. 11 is a view illustrating diagrammatically a chain drive using a drive chain such as that of Fig. 6 wherein there are two sprocket wheels inclined to each other, two shafts in the same plane carrying said sprocket wheels and two idlers between said sprockets to assure guiding of the chain into and out of said sprockets in the planes thereof;

Fig. 12 is a diagrammatical view illustrating a reversible chain drive connecting two shafts not in the same plane, one shaft having a sprocket fixed thereon and an idler sprocket, two idlers on the other shaft, a chain bendable in two directions extending from opposite sides of the fixed sprocket over the idlers on the second shaft and around the idler on the first shaft and clutch means to connect the second shaft to either of the idlers thereon;

Fig. 13 is a diagrammatic view of a chain drive wherein two parallel shafts are driven in opposite directions by a chain passing around a sprocket on a drive shaft by use of another sprocket on a shaft parallel to the drive shaft;

Fig. 14 is a diagrammatic view illustrating a chain drive similar in arrangement to that of Fig. 12 but with one sprocket fixed on each shaft, an idler on one of these shafts and a second idler drawn back by a spring;

Fig. 15 illustrates a reversible chain drive which is essentially the same as that in Fig. 12, differing therefrom by the use of two idlers in the loop instead of the one idler as shown in Fig. 12;

Fig. 16. illustrates a chain guide which takes the place of a rotating idler;

Fig. 17 is a section taken along line 17—17 of Fig. 16;

Fig. 18 is a view illustrating a rotary idler without teeth;

Fig. 19 is a section taken along line 19—19 of Fig. 18;

Fig. 20 is in most respects the same as Fig. 11 except that there are two main sprockets of different size and that in order to hold the chain in proper position with reference to the smaller of the main sprockets two additional idlers are used in addition to those used in Fig. 11;

Figs. 21 to 25 illustrate a third form of drive chain, Fig. 23 being a section taken on line 23—23 of Fig. 21; and Figs. 26 and 27 illustrate a fourth form of drive chain, Fig. 27 being a section along line 27—27 of Fig. 26.

Referring to Figs. 1 through 5 of the drawings, 10 and 11 designate chain sprockets or sprocket wheels. These sprockets are fixed to shafts 12 and 13 respectively, extending at an angle to each other and not in the same plane. As illustrated said sprocket wheels 10 and 11 are fixed to shafts 12 and 13 by keys 14 and 15 respectively.

Each of said sprocket wheels is provided with a groove 16 at its periphery thus providing at opposite sides of the groove flanges 17 and 18 provided at their peripheries with teeth 19. Each pair of said toothed flanges may be considered as separate sprocket wheels 17 and 18 integral with a hub fixed to the corresponding shaft, which is the equivalent of two separate sprocket wheels 17 and 18 secured to a hub which in turn is connected to the corresponding shaft.

Said sprocket wheels 10 and 11 are connected for driving purposes by a roller sprocket chain indicated generally at 20. As illustrated the planes of the sprocket wheels 10 and 11 are perpendicular. Obviously, in order for the chain 20 to be looped around the sprocket wheels 10 and 11, the left reach of chain 20 in Fig. 1 would have to be inclined downwardly to the left to engage sprocket 11, and the other reach of the chain 20 would have to be inclined correspondingly.

It is evident that for the chain 20 to bend in the two planes of the sprocket 10 and the sprocket 11 it must be pivotally connected at predetermined points to run around part of sprocket 11 and pivotally connected at points alternating with said predetermined points by pivots arranged angularly with respect to the first mentioned pivots. The structure of a chain adapted for use in this way is illustrated in Figs. 3, 4 and 5. This chain is made up of identical links 21 connected by shafts or pivot pins 22 and 23 arranged alternately at different angles. Fig. 3 shows three links 21 attached together by two pins 22 and 23, two of the links being shown in section.

In Fig. 4, a link 21 is shown in the position of the middle link of Fig. 3 and in Fig. 5 is shown a link 21 turned through an angle of 90° laterally of the chain so that an ear 24 thereof may be inserted between spaced ears 25 of a link to the left, and a pin 23 may be passed through aligned perforation 26 therein. The inclines 27 of Fig. 5 are indicated on Fig. 4 and the inclines 28 of Fig. 5 are indicated at 28 on Fig. 4. Each of the pins 22 and 23 has a shoulder 29 formed near one end to limit the inward movement of the pin and also has a head 30. A roller 31 is mounted on each of said pins adjacent its head 30 and another roller 31 is mounted on the other end of the pin and held thereon by means of a washer 32 on a reduced portion 33 of the pin and a cotter pin passing through said reduced end.

Figs. 6, 7, 8, 9 and 10 illustrate another embodiment of the invention. A chain 40 connects two double sprockets 41 and 42 mounted on shafts 43 and 44, respectively. The sprockets 41 and 42 are in planes that are perpendicular to each other and the shafts 43 and 44 are not in the same plane. Also, as illustrated the plane of each sprocket is tangential to the other sprocket.

Said chain 40 is formed of identical links 45 as clearly shown in Figs. 8, 9 and 10. Said links 45 are pivotally connected by means of pivots or pins 46, each of which extends through a bore 47 in a central ear or arm 48 at one end of a link 45 and corresponding bores 49 in ears or arms 50 extending in a yoke or fork form from the hub 51 of another link 45 which is turned through 90° from the positions of links at the ends thereof.

Each of said pins 46 is formed with a central portion to fit in said bores 47 and 49 and with reduced ends to receive thereover the inner ends of sleeves 52 having outturned flanges 53 to hold thereon rollers 54. The inner ends of said sleeves fit in counterbores in the ears 50. Sleeves 52 are held on said pins 48 by flanges 53 and spring devices such as split rings 56 spring into grooves 57 in said reduced ends.

In view of the form of chain 40 with rollers 54 at their outer sides thereof, the sprockets 41 and 42 are double sprockets. For convenience and economy, said sprocket wheel 41 may be formed of standard sprocket wheels 60 and 61 (Fig. 7) secured by bolts 62 to a central disk or hub 63 provided with a boss 64 which may be secured to said shaft 41 by suitable means such as a set screw 65. Similarly double sprocket wheel 42 (Fig. 6) may comprise standard sprocket wheels 66 and 67 secured by bolts 68 to a disk or hub 69 provided with a boss 70. Said boss 70 fits on shaft 44 and may be secured thereto by a set screw 71.

As seen in Figs. 6 and 7, only every other space between the teeth of each single sprocket wheel receives a roller 54. The reach at the right hand of Figure 6 is inclined upwardly and to the right and the same reach is shown in Fig. 7 as leading upwardly to the sprocket wheel 41. Furthermore the stretch of chain 40 which goes down at the left in Figure 6 is shown in Figure 7 as extending downwardly and to the right to mesh with the sprocket wheel 42. The right hand reach of the chain (Fig. 6) therefore leaves the lower sprocket 42 at an angle and enters the upper sprocket wheel 41 in the plane of said wheel, and the other reach is drawn off at an angle from sprocket wheel 41 and guided into sprocket wheel 42 in the plane thereof. Either sprocket wheel 41 or 42 may be used as a driving member but the chain must always run in the same direction so that in leaving the lower sprocket at an angle it will come straight into the upper sprocket and leaving the upper sprocket at an angle it will come straight into the lower sprocket.

Fig. 11 illustrates a drive between two shafts 75 and 76 that are in the same plane but may form any angle therebetween. Obviously their axes meet at a point. On these shafts 75 and 76 are sprocket wheels 77 and 78 respectively and these sprocket wheels are connected by a driving chain 40 looped therearound. In order to lead the chain 40 in the correct paths to and away from the two sprockets 77 and 78, use is made of small idler sprockets 79 and 80. In this arrangement the driving and the driven sprocket wheels are of the same diameter making the shafts turn with the same angular velocity. Either one of the sprocket wheels may be used to drive and they may rotate in either direction.

Fig. 12 illustrates a drive between two shafts 81 and 82 carrying sprockets 83 and 84 which are perpendicular to each other. Of these sprockets 83 is fixed on the shaft 81 and 84 is loose for rotation on the shaft 82. The upper shaft 82 has a second idler sprocket 85 and mounted on the lower shaft 81 is an idler sprocket 86. The sprocket 83 may be fixed to the shaft 81 in any suitable manner. The sprocket wheels 84 and 85 are provided at their inner faces with clutch members 87 and 88. Slidably keyed on said shaft 82 are clutch members 89 and 90 adapted to engage either clutch members 87 or 88 by means of a lever 91 connected thereto in any suitable manner.

In this form the chain 40 extends upwardly at the right from the sprocket 83 around the sprocket 84 and down to sprocket 86 from which it extends upwardly to sprocket 85 around which it passes to extend downwardly to the sprocket 83 again. Assuming shaft 81 to be the driving shaft it can be used to draw down the right hand reach of the chain and turn sprocket 84 in a clockwise direction and may act in turn to pull upwardly on the stretch between sprocket 84 and sprocket 86 to turn the sprocket 86 in a counterclockwise direction. This movement of sprocket idler 86 turns the idler 85 in a counterclockwise direction the chain returning from idler 85 to fixed sprocket 83. By throwing the lever 91 to the right in Fig. 12 the shaft 82 may be coupled to the idler 84 and by throwing the lever to the left the shaft 82 may be coupled to the sprocket 85. The arrangement may be such that by moving the lever 91 to an intermediate position both sprockets 84 and 85 will be left loose on shaft 82. In this arrangement either shaft can be driven from the other and by controlling the clutch the connection may be reversed.

Fig. 13 illustrates a drive which is in general the same as that shown in Figs. 6 and 7 but it has been made suitable for rotation in either direction by using two idler sprockets 92 and 93. The function of the idlers 92 and 93 is to make the chain enter the sprocket wheel in the same plane in which it rotates, regardless of the direction of rotation. These idlers also eliminate side thrust on the driving sprocket and on the driven sprocket.

Fig. 14 illustrates a drive similar to the drive shown in Fig. 12 but due to the omission of any clutch means it is not reversible. On one shaft 82 there are two sprocket wheels, one 84 fixed thereto and one 85 mounted loosely thereon. On shaft 81 there is a sprocket wheel 83 that is fixed thereto. There is also a fourth sprocket wheel 86 which is not mounted rigidlly but is suspended by means of a spring 95 connected at one end to a fixed member and in the other end to a yoke 96 in which the sprocket 86 is rotatable. When the drive is operated in the direction desired the driving force is transmitted directly between the attached sprocket wheel 84 on the upper shaft and the sprocket wheel 83 on the lower shaft. The suspended idler 86 merely keeps the chain taut and no driving force is transmitted through the part of the chain engaging this idler.

Fig. 15 illustrates a drive similar to that of Fig. 12. In this drive there is a substantial change in angular velocity between the two shafts 81 and 82. Consequently a relatively large sprocket wheel 83 is fixed on the shaft 81 and the smaller sprocket 84 is used on the other shaft 82. To avoid using on the shaft 81 a large idler sprocket of the same general size as sprocket 83, use is made of two smaller idlers 98. This drive is also reversible by means of a lever 91 and clutch mechanism similar to that illustrated in Fig. 12.

In the discussion up to this point it has been assumed that the so-called idlers are sprocket wheels of the same type as the driving and driven sprocket wheels, except that they do not have means for fixing them to the shaft against relative rotation, such as keys or set screws. To enable the idlers to rotate freely around the shaft, each idler may be provided with a bushing or ball bearing on said shaft.

Figs. 16 and 17 illustrate a stationary chain guide 100 which in some applications may take the place of an idler sprocket in any of said drives. The guide 100 is fixed to a bracket 101 or any stationary support. The guide has no teeth but the rollers 54 are supported on arcuate flanges 102 at opposite sides of a central channel 103 into which the rollers 54 at one set extend. In Figures 18 and 19 there is illustrated a wheel 105 having a periphery shaped in cross section like that of the guide 100.

In Fig. 20 there is illustrated a drive of the same general type as that illustrated in Fig. 11. Shafts 75 and 76 may be in the same plane and at any angle to each other in that plane. In this form there is a change of speed between shafts 75 and 76 so that the driving sprockets 77 and 78 are of different diameters. In order to avoid a twisting force on the part of the chain two sprockets 110 are used in addition to idler sprockets 79 and 80.

A chain drive according to the present invention provides an almost ideal transmission for a machine having a turn table or a drum turning about a vertical axis. The conventional roller chain has been used for this purpose but it requires a vertical drive shaft which usually is inconvenient. The drive particularly suited for this purpose is that shown in Fig. 15, either with or without the clutches. The provision of a drive shaft having a sprocket in a plane perpendicular to a sprocket on the drum axis also makes it convenient to drive a drum rotating about a horizontal axis. The driven sprocket may be an integral part of the drum or turn table or it may be formed by segments bolted to the rim of the drum or turn table and having teeth on their outside rim.

Figs. 21, 22, 23, 24 and 25, illustrate a double sprocket wheel 112 in connection with another form of roller chain 113 embodying the present invention. Said double sprocket wheel comprises two separated rim portions 114 carrying circumferential sets of sprocket teeth 115 spaced apart to enable the body of the chain 113 to pass therebetween while laterally projecting rollers 116 rest in the notches or recesses between said teeth 115. Said rim portions 114 extend inwardly from the teeth 115 but leave a space between said rim portions to accommodate rollers 116 turned through 90° from those of the first set. It should be noted that the arrangement of teeth 115 is a standard one and that rollers 116 occupy successive notches or recesses between said teeth.

Said chain 113 is composed of elements as links of two different forms 117 and 118, respectively, held together by pins or shafts 119. Each link 117 (Fig. 24) is formed with a fork or yoke at each end, said forks being turned 90° with respect to each other. Each fork is formed with two tines or ears 120 with alined bores 121. Each link 118 (Fig. 25) is in the form of a block which may conveniently be described as having a horizontal bore 122 at the left in Fig. 25 and a vertical bore 123 at the right. The links 118 are fitted into corresponding yokes or forks of links 117 and successive links may be secured together by pins 119. The rollers 116 are held on the ends of pins 119 by split washers 124 sprung into grooves 125 in the end portion of said pins (Figs. 22 and 23).

Figs. 26 and 27 disclose still another form of chain 130 used in connection with a sprocket wheel 131 which may be of the same form as sprocket wheel 112 in Fig. 21. This chain may be made up of link blocks 118 and flat links or link members 132 with holes 133 in their ends. The link members 133 are used in pairs and secured at their ends to said blocks 118 by pins 119 carrying on their ends rollers 116 which are held thereon by split rings or washers sprung into grooves 125 at the ends of said pins. Successive pairs of links 133 are turned through 90 degrees with respect to each other.

It will also be evident that chains according to the present invention may be used to form a quiet driving connection between two sprocket wheels in parallel planes and necessarily on parallel shafts. For this purpose a pair of idler sprockets would be provided adjacent each of the main sprockets to turn the chain into lines connecting said idlers.

The non-twisting roller chain of the present invention has many advantages over twisting roller chains in drives such, for example, as illustrated in Figs. 6 and 7 where the chains enter the sprocket wheels in exactly the right position. With a twisting roller chain the links as they engage a sprocket are forced into the proper positions by the sprocket teeth.

According to the present invention, two sprocket wheels in planes perpendicular to each other may be connected by a chain according to the present invention even if they are very close together whereas in a twisting chain the twist between two successive links would be so great that the links would not enter the sprockets.

The adaptability of a twisting roller chain to change direction is limited by the maximum twist that can be given to a short length of chain, whereas the chain of the present invention may by using a suitable arrangement of idlers, be used for connecting in a practical way sprockets in almost any relative arrangement. The switch means used in twisting chains constitute weak points in the driving connection.

It should be understood that various changes can be made and that certain features may be used without others, without departing from the true spirit and scope of the invention.

What is claimed is:

1. A driving chain comprising elements arranged in succession, means including pivots connecting successive elements and projecting beyond the sides thereof, rollers on the projecting ends of said pivots, alternate pivots in a straight stretch of the chain being parallel in a plane and the remaining pivots in said stretch being parallel in a plane perpendicular to the plane of said alternate pivots.

2. A driving chain according to claim 1 wherein said elements are duplicates.

3. A driving chain according to claim 1 wherein there are bushings on the ends of said pivots and said rollers are mounted on said bushings.

4. A driving chain according to claim 1 wherein said elements are duplicates and each of said elements has at one end a single central ear with a bore to receive one of said pivots and at the other end a fork comprising a pair of ears turned through an angle of 90° with respect to the single ear and having aligned bores to receive one of said pivot pins, the ears of said pair being spaced to receive a single ear of an adjacent link element.

5. A driving chain according to claim 1 wherein alternate elements consist of links providing one set of duplicate links and the remaining elements consist of links providing a second set of duplicate links different from those of the first set, each link of the first set comprising at opposite ends yokes turned through 90° with respect to each other and having aligned pivot-receiving bores in the opposite sides of each yoke, and each link of the second set having pivot-receiving bores at opposite ends thereof and turned through 90° with respect to each other for connection with yokes of links of the first set.

6. An endless driving chain according to claim 1 wherein alternate elements consist of links providing one set of duplicate links in the form of blocks each having at opposite ends and turned through 90° with respect to each other, bores receiving said pivots of said block, and the remaining elements providing a second set of duplicate links, each comprising a pair of flat link members having at opposite ends equally spaced pivot-receiving openings in which said pivots are secured.

7. A chain drive comprising two double sprocket wheels in different planes, a shaft for each of said sprocket wheels, and means for driving one of said sprocket wheels from the other including an endless chain and means for directing the chain to the driving sprocket wheel in the plane thereof, said chain comprising link elements, pivots connecting said link elements together and projecting beyond said link element at both sides thereof, rollers mounted on the ends of said pivots, alternate pivots constituting a set extending through the chain in one direction and the remaining pivots constituting a set extending through the chain at an angle of 90° with respect to those of the first set, the rollers on the pivots of one set engaging one sprocket wheel and the driven sprocket wheel cooperating with the rollers on one set of pivots assisting in producing such engagement.

8. A chain drive according to claim 7 wherein the arrangement of said sprocket wheels causes the chain to enter the driving sprocket wheel in the plane thereof.

9. A chain drive according to claim 7 wherein the two sprocket wheels are in perpendicular planes and each sprocket wheel is in a plane tangential to the other.

10. A chain drive according to claim 7 wherein there is at least one idler guiding element engaging the chain between the driving and driven sprocket wheels.

11. A chain drive according to claim 7 wherein said shafts are in the same plane and there are two idlers in planes at right angles to the planes of said driving and driven sprockets and tangential thereto, the driving and driven sprocket engaging rollers on the same set of pivots and the idlers engaging rollers on the other set of pivots.

12. A chain drive according to claim 11 wherein one of the driving and driven sprocket wheels is larger than the other and there is a pair of idlers in the plane of one of them to bring the two reaches of the chain to the diameter of the other sprocket wheel before passing around said idlers at right angles to the driving and driven sprocket wheels.

13. A chain drive according to claim 7 wherein the two sprocket wheels are perpendicular to each other and the means for directing the chain from one sprocket wheel to the other includes an idler engaging each reach of the chain between the driving and driven sprockets to guide the chain toward and away from each of the driving and driven sprockets in the plane thereof.

14. A chain drive comprising a shaft, a double sprocket wheel fixed on said shaft; a pair of double sprocket wheels loosely mounted on a second shaft; the sprocket wheels of said pair being positioned with their planes tangent to the first mentioned sprocket wheel; an endless chain extending around the first mentioned sprocket wheel and over the double sprocket wheels and providing a loop therebeyond; idler means engaging said loop from the inside and maintaining parallel the reaches of the chain to the two sprocket wheels on the second shaft; said chain comprising link elements connected by pivots arranged in sets with those in one set extending through the chain in one direction and the pivots of the other set extending at 90° from the first set, and rollers on the ends of said pivots, the rollers on one set of pivots engaging the first mentioned sprocket wheel and the rollers on the second set engaging the sprocket wheels on the second shaft; and clutch means to connect the second shaft to one of said sprocket wheels thereon or to leave both of them free.

15. A chain drive according to claim 14 wherein said idler means is an idler on the shaft with said fixed double sprocket and of the same diameter.

16. A chain drive according to claim 14 wherein said idler means comprises two idlers.

17. A chain drive comprising a shaft, a double sprocket wheel fixed on said shaft, a second shaft, a double sprocket fixed on said second shaft, the planes of each of said sprocket wheels being tangential to the other sprocket wheel, an idler at said second shaft and spaced from the second mentioned double sprocket wheel a distance equal to the diameter of the first fixed double sprocket wheel, a roller chain having a set of alternate pivots with rollers on their ends and extending in one direction for engagement of the rollers thereon with the first mentioned sprocket wheel and extending upwardly at both sides thereof, and a second set of roller carrying pivots at right angles to the pivots of the first set to enable the chain to bend in a plane perpendicular to the plane of the first set and provide a loop, a second idler at the inside of said loop and means acting on said second idler to tension said chain.

18. A chain drive according to claim 17 wherein said idler first mentioned is a rotary double wheel, and said idler second mentioned is a rotary member, and said tensioning means for said second idler comprises a spring and means for attaching said spring to a fixed member.

19. A chain drive according to claim 17 wherein both of said idlers are double sprocket wheels.

AAGE ERLAND JORGENSEN.

REFERENCES CITED

The following references are of record in the file of this patent:

UNITED STATES PATENTS

| Number | Name | Date |
|---|---|---|
| 1,662,093 | Wells et al. | Mar. 13, 1928 |
| 1,790,297 | Alger | Jan. 27, 1931 |
| 1,965,285 | Gilstad | July 3, 1934 |

FOREIGN PATENTS

| Number | Country | Date |
|---|---|---|
| 10,803 | Great Britain | 1906 |